Aug. 20, 1929.  C. N. MERTES  1,725,592
CONTAINER FOR DRY CELLS AND METHOD OF FORMING SAME
Filed July 2, 1928   2 Sheets-Sheet 1
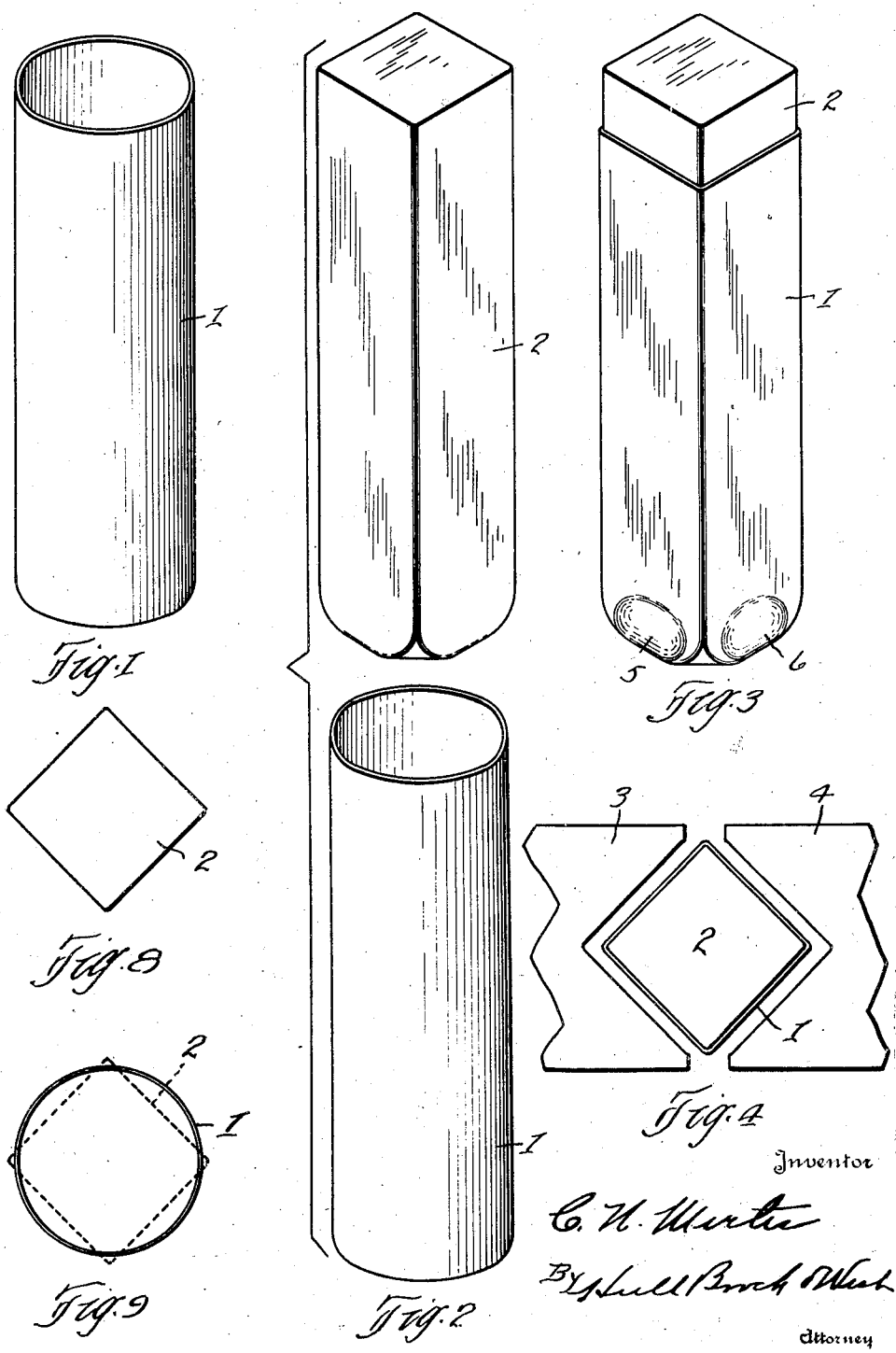

Aug. 20, 1929.　　　C. N. MERTES　　　1,725,592
CONTAINER FOR DRY CELLS AND METHOD OF FORMING SAME
Filed July 2, 1928　　　2 Sheets-Sheet 2
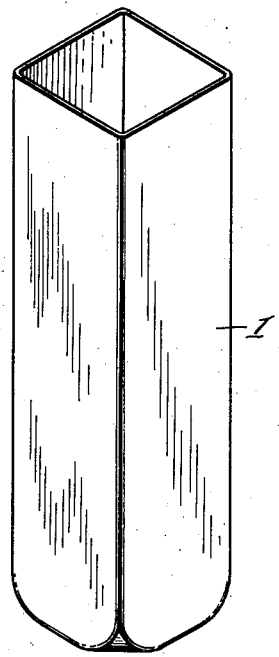
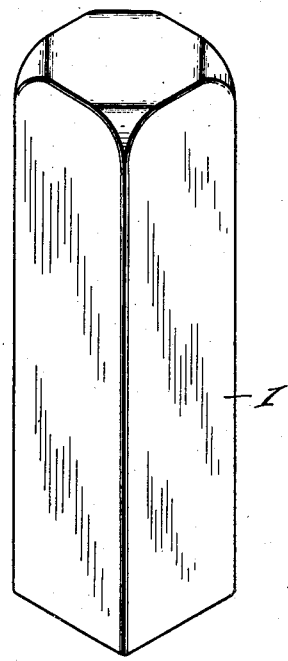
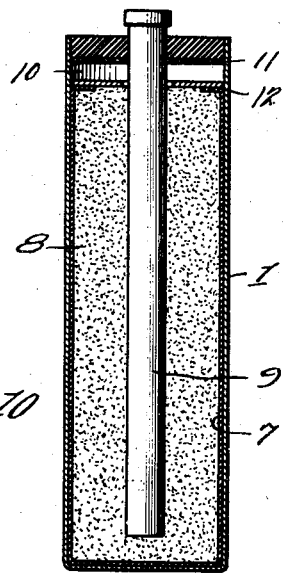
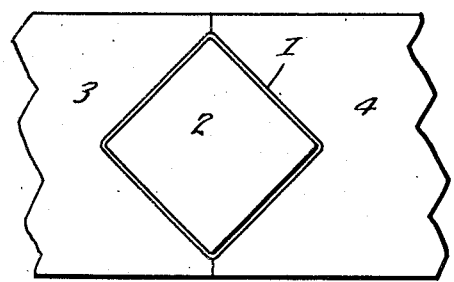

Patented Aug. 20, 1929.

1,725,592

UNITED STATES PATENT OFFICE.

CLARENCE NICHOLAS MERTES, OF BEREA, OHIO, ASSIGNOR TO GENERAL DRY BATTERIES, INCORPORATED, OF CLEVELAND, OHIO, A CORPORATION OF OHIO.

CONTAINER FOR DRY CELLS AND METHOD OF FORMING SAME.

Application filed July 2, 1928. Serial No. 289,938.

This invention relates generally to containers for dry cells and to the method of forming such containers.

Heretofore dry cells have been generally made in the form of cylindrical containers in which is packed a suitable depolarizing mix containing the positive or carbon electrode, the container itself being usually of zinc and serving as the negative electrode. With the advent of radio there arose the necessity of the so-called radio B battery. These batteries have usually consisted of a number of small cells enclosed and sealed within a single container and connected in series. Due to the large demand for B batteries it became necessary to devise means to produce these cells in large quantities and at comparatively low cost. These cells are considerably smaller than the ordinary size cell and the general practice has been to form the container by drawing a single piece of metal to the form of a cylindrical can of the desired dimensions. When the cells are completed it has been customary to assemble a number of cells in a single rectangular container, the cells being of course insulated one from the other and connected in series.

In assembling the round cells in a rectangular container considerable space is left vacant between the adjacent cans. To meet this situation cells were made rectangular in shape, usually square, so that the cans could be arranged within the container closely adjacent each other without leaving the space between cans. Due to the fact that square cans of the desired size could not be drawn from a single piece of metal, it became necessary to form a blank and then to bend it into the desired shape and solder the joints. This operation proved costly and unsatisfactory because of the fact that a good soldered joint could not be obtained and with the result that many cans leaked, thus rendering the cell defective. Often times this defect was not discovered until the cells were assembled and sealed in a battery unit, and in some cases after the battery had been placed in service with the result that the whole unit would be rendered defective.

It is therefore the main object of this invention to provide a one piece seamless metal container for dry cells which will obviate the difficulties hereinbefore mentioned and at the same time be well adapted for quantity production at comparatively low cost.

A further object of the invention is to provide a simple and efficient method of producing these containers at comparatively low cost.

Further and more limited objects of the invention will appear as the description proceeds and by reference to the accompanying drawing in which Fig. 1 is a full size view in side elevation of a drawn metal cylindrical can; Fig. 2 is a view showing the mandrel just prior to being inserted into the can; Fig. 3 is a perspective view showing the mandrel inserted into the can; Fig. 4 is a diagrammatic view of the vise for squaring the can; Fig. 5 is a similar view showing the vise in closed position; Figs. 6 and 7 are perspective views of the squared can; Fig. 8 is an end view of the outer end of the mandrel; Fig. 9 is a diagrammatic view showing the relative size of the mandrel and cylindrical; and Fig. 10 is a vertical sectional view of a finished cell.

In practicing my method I first draw a cylindrical can 1 from a single piece of metal. I then provide a mandrel 2 which is of the desired shape, preferably square in cross section, and slightly longer than the height of the cylindrical cans. The inner end of the mandrel is slightly tapered and rounded as shown most clearly in Fig. 2. The diagonal of the square mandrel is preferably slightly greater than the diameter of the cylindrical can. I then insert the mandrel into the cylindrical can until the inner end of the same engages the bottom of the can. The can with the mandrel therein is then placed in a press or vise consisting of a pair of movable jaws 3 and 4 having complementary recesses therein which, when moved to the position shown in Fig. 5 form a square opening. The jaws 3 and 4 are then moved to the position shown in Fig. 5 and serve to bend the side walls of the can to conform to the shape of the mandrel. The mandrel is then removed leaving a square, one piece, seamless, metal container which is well adapted for use as a container for dry cells. The bottom of the container is shaped as shown most clearly in Fig. 7 as the inner end of the mandrel bears against the bottom and gives it this shape. The metal adjacent the bottom of the can is stretched or drawn slightly when the mandrel is inserted and the can is bulged outwardly slightly at this point, as shown at 5 and 6 in Fig. 3; however, the finished can is substantially square.

In Fig. 8 there is disclosed a completed cell consisting of a square, one piece seamless metal can 1 having a bibulous lining 7, a mass of depolarizing mix 8, a carbon electrode 9, an expansion reservoir 10 formed by washers 11 and 12 and a seal 13 sealing the top of the cell.

It is to be understood that the order in which the several steps of my process are carried out is immaterial as the mandrel may be inserted into the can either before or after the can has been squared in the vise. It is also to be understood that the step of inserting the mandrel may be omitted entirely as it is possible to square the can in the vise alone although the bottom of the can will be flexed inwardly if the mandrel is not first inserted, as hereinbefore described. It is also to be understood that the shape or size of the mandrel may be varied without departing from the spirit of my invention and that my invention is limited only in accordance with the scope of the appended claims. Certain of the claims specify that the depth of the can is considerably greater than its diameter. In order that there may be no misunderstanding as to the term "considerably greater" I mean that the depth of the can is such that it cannot be drawn or extruded polygonal or square in cross section.

Having thus described my invention, what I claim is:—

1. An electrode for dry cells comprising a one piece seamless, metallic can the opposite sides of which are parallel with each other, the depth of said can being considerably greater than its diameter.

2. An electrode for dry cells comprising a one piece seamless metal can the opposite sides of which are parallel and the adjacent sides of which are at right angles to each other, the depth of said can being considerably greater than its diameter.

3. An electrode for dry cells comprising a metal can the sides and bottom of which are formed from a single piece of metal, the said can being seamless and substantially square in cross section and having considerably greater depth than diameter.

4. An electrode for dry cells comprising a rectangular seamless can formed from a single piece of metal and having considerably greater depth than diameter.

5. An electrode for dry cells comprising a square, seamless can formed from a single piece of metal, the depth of the can being considerably greater than its diameter.

6. The method of making a one piece, seamless, square electrode for dry cells which consists in drawing a circular can from a single piece of metal, the depth of said can being considerably greater than its diameter, inserting a square mandrel within the circular can and bending the walls of the can to conform to the shape of the mandrel.

7. The method of making a rectangular one piece seamless, one piece electrode for dry cells which consists in drawing a single piece of metal to form a cylindrical can the depth of which is considerably greater than its diameter, inserting a rectangular mandrel into the cylindrical can and bending the walls of the can to conform to the shape of the mandrel.

8. The method of making a polygonal one piece, seamless, drawn metal electrode for dry cells which consists in drawing a single piece of metal to form a cylindrical can the depth of which is considerably greater than its diameter, inserting a polygonal mandrel into the cylindrical can and bending the sides of the can to conform to the shape of the mandrel.

9. The method of making a square one-piece, seamless, drawn metal electrode for dry cells which consists in drawing a single piece of metal to form a cylindrical can the depth of which is considerably greater than its diameter, inserting a square mandrel into the cylindrical can until the inner end of the mandrel bears against the bottom of the can and bending the walls of the can to conform to the shape of the mandrel.

10. The method of making a square, one piece, seamless, drawn metal electrode for dry cells which consists in drawing a single piece of metal to form a cylindrical can the depth of which is considerably greater than its diameter, forcing a mandrel into the cylindrical can until the inner end of the mandrel bears against the bottom of the can, the mandrel being square in cross section and having a rounded inner end, then bending the walls of the can to conform to the shape of the mandrel.

11. The method of making a polygonal, one piece, seamless, drawn metal electrode for dry cells which consists in drawing a single piece of metal into the form of a cylindrical can having a substantially flat bottom the depth of said can being considerably greater than its diameter, inserting a polygonal mandrel into said cylindrical can until the inner end of the mandrel engages the bottom of the can, the inner end of the mandrel being rounded and serving to prevent the bottom of the can from flexing inwardly, and bending the walls of the cylindrical can to conform to the shape of the mandrel.

12. The method of making a square, one piece, seamless, drawn metal electrode for dry cells which consists in drawing a single piece of metal to form a cylindrical can having a substantially flat bottom, the depth of the can being considerably greater than its diameter, inserting into the can a square mandrel having a rounded inner end adapted to bear against the bottom of the can, then bending the side walls of the can to conform to the shape of the mandrel.

13. The method of making an electrode for dry cells which consists in drawing a single piece of metal into the form of a cylindrical, one piece, seamless can having considerably greater depth than diameter and then bending the walls of the can until the opposite sides are parallel and the adjacent sides are at right angles to each other.

14. The method of making a square one piece, seamless, drawn metal electrode for dry cells which consists in drawing a single piece of metal into the form of a cylindrical can having considerably greater depth than diameter, inserting a square mandrel into the cylindrical can, the diagonal of the mandrel being slightly greater than the diameter of the cylindrical can, and bending the walls of the can to conform to the shape of the mandrel.

15. An electrode for dry cells comprising a polygonal seamless can formed from a single piece of metal and having considerably greater depth than diameter.

16. An electrode for dry cells comprising a polygonal seamless drawn metal can formed from a single piece of metal and having considerably greater depth than diameter.

17. An electrode for dry cells comprising a polygonal drawn metal can formed from a single piece of metal, the depth of the can being considerably greater than its diameter.

18. An electrode for dry cells comprising an elongated one-piece seamless polygonal can and having considerably greater depth than diameter.

19. An electrode for dry cells comprising an elongated drawn metal seamless polygonal can having a substantially flat bottom and having considerably greater depth than diameter.

20. An electrode for dry cells comprising an elongated seamless can, polygonal in cross section, the depth of the can being considerably greater than its diameter.

21. The method of making a polygonal drawn metal electrode for dry cells which consists in drawing a circular can from a single piece of metal the depth of said can being considerably greater than its diameter, inserting a polygonal mandrel within the circular can and bending the walls of the can to conform to the shape of the mandrel.

22. The method of making a polygonal seamless one-piece drawn metal electrode for dry cells which consists in drawing a single piece of metal into the form of a cylindrical can the depth of said can being considerably greater than its diameter, inserting into the cylindrical can a mandrel which is polygonal in cross section and bending the walls of the can to conform to the shape of the mandrel.

23. The method of forming a polygonal drawn metal electrode for use in a dry cell which consists in drawing a single piece of metal into the form of a cylindrical can the depth of which is considerably greater than its diameter, bending the walls of the can until the can is polygonal in cross section.

24. The method of making a polygonal seamless one piece drawn metal electrode for dry cells which consists in drawing a single piece of metal into the form of a cylindrical, one piece, seamless can having a substantially flat bottom, bending the walls of the can until the can is polygonal in cross section.

In testimony whereof, I hereunto affix my signature.

CLARENCE NICHOLAS MERTES.